July 16, 1935. G. MacCONVILLE 2,008,510
SOOT BLOWER
Filed Nov. 28, 1932
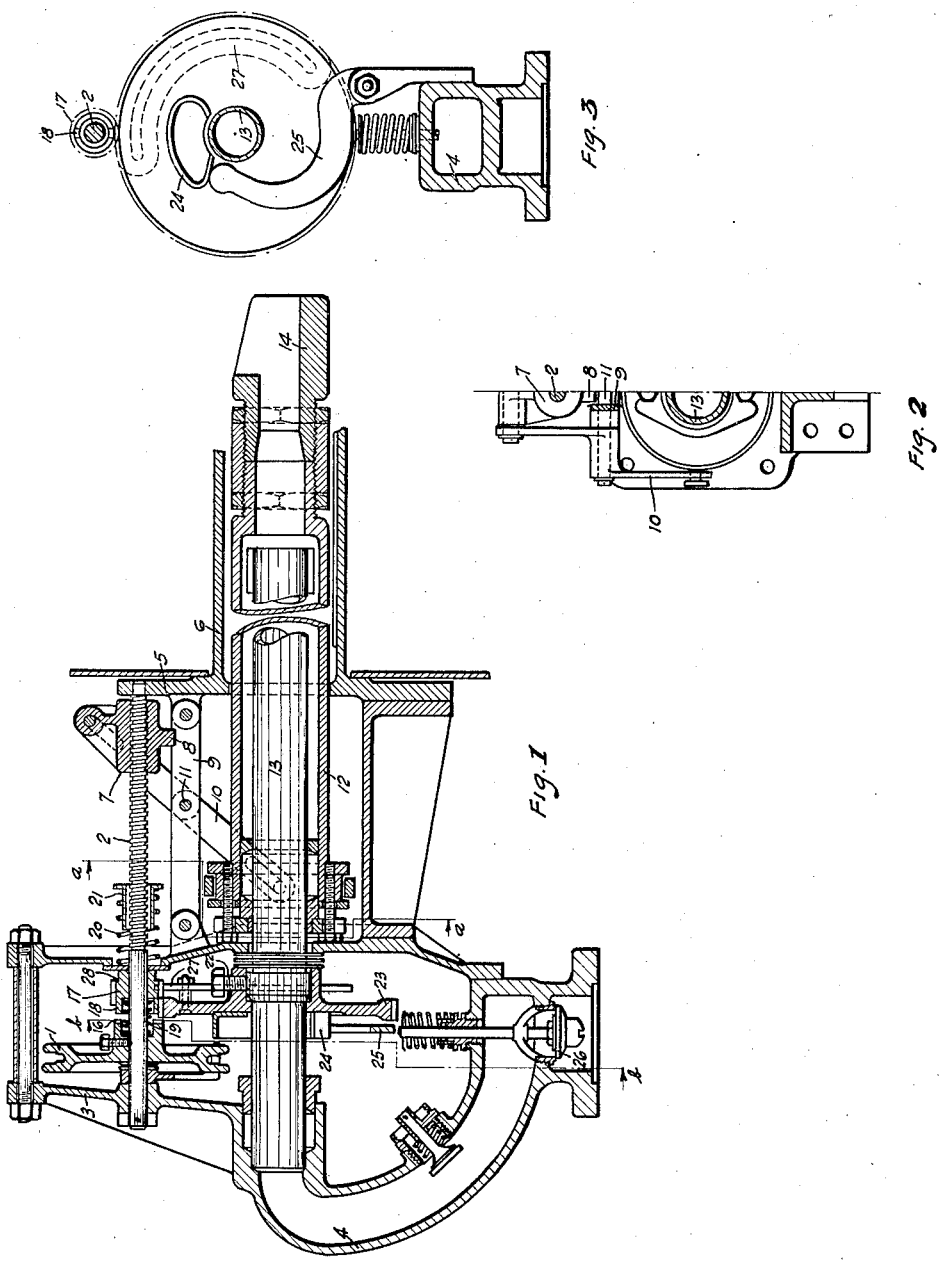
INVENTOR.
Gordon MacConville
BY
ATTORNEYS Patented July 16, 1935

2,008,510

UNITED STATES PATENT OFFICE 2,008,510

SOOT BLOWER

Gordon MacConville, Paisley, Scotland, assignor to Diamond Power Specialty Corporation, Detroit, Mich., a corporation of Michigan Application November 28, 1932, Serial No. 644,645
In Great Britain November 28, 1931

3 Claims. (Cl. 122—392)

This invention relates to improvements in and connected with boiler cleaners or soot blowers of the type in which the blower nozzle is adapted to be advanced into operative position and retracted from such position into the furnace wall when not in operation. The invention has for its object to provide an improved construction of such blowers.

In a blower in accordance with the invention a sheave wheel or crank handle is adapted to rotate a screw-threaded spindle engaged by a nut-forming member adapted when displaced axially by rotation of the spindle to actuate levers serving to project the blower into or retract it from the furnace.

In accordance with a further feature a clutch is interposed between the sheave wheel or crank handle and the cam mechanism controlling the supply of cleaning fluid to the blower in such manner that the cam mechanism is operated to supply cleaning fluid to the blower only when the latter has been projected into the furnace by displacement of the nut-forming member.

In one convenient embodiment of the invention the nut-forming member is carried at one end of a pivoted lever, the other end of which engages the sleeve carrying the blower nozzle surrounding the blower pipe so that on rotation of the sheave wheel or crank handle to bring the nut-forming member towards the same the blower nozzle is projected forwardly. The sheave wheel or crank handle is formed with dogs and the pinion formed with mating dogs forming the clutch. The dogs on the pinion are normally held out of engagement with the dogs on the sheave wheel or crank handle by means of a spring, the pressure of which is overcome by the pressure of the nut-forming member on a stronger spring located between it and the loosely mounted pinion.

Means is provided to ensure that the clutch members will not disengage so long as cleaning fluid is being supplied to the blower nozzle.

A boiler cleaner or soot blower constructed in accordance with the invention is illustrated by way of example in the accompanying drawing in which Fig. 1 is a vertical longitudinal section, Fig. 2 a transverse section on the line a—a of Fig. 1, and Fig. 3 a transverse section on the line b—b of Fig. 1.

Referring to the drawing, I denotes a sheave wheel such as that normally used for rotating a blower pipe but adapted in the present construction to rotate a screw-threaded spindle 2 journalled at one end in a bracket 3 formed integral with or mounted on the gooseneck 4 and at the other end in a bracket 5 unitary with a wall box or the like 6. On the screw-threaded spindle 2 is threaded a nut-forming member 7 held against rotation by a tongue 8 integral with the nut-forming member 7 and slidable between a pair of fixed guide bars 9. The nut-forming member 7 is connected through the medium of two double-armed slotted levers 10 (one of which is shown) pivoting about a common fulcrum spindle 11 carried by the guide bars 9 with a sleeve 12 surrounding the blower pipe 13 so that, on rotation of the sheave wheel 1 in the direction to move the nut-forming member 7 rearwardly, the sleeve 12 is moved forwardly and the blower nozzle 14 attached to the inner end of the sleeve 12 is projected into the furnace.

In order to ensure that the cleaning fluid will not be admitted to the blower pipe 13 when the blower nozzle 14 is within the furnace wall and shielded from the heat of the furnace I provide improved means for opening the blower valve to admit the cleaning fluid only when the blower nozzle 14 has been advanced into the furnace.

To this end there is loosely mounted on the spindle 2 a pinion 17 provided with dog clutch teeth 18 adapted to mate with dog clutch teeth 16 provided on the sheave wheel 1. The dog teeth 18 of the pinion 17 are normally held out of engagement with the dog teeth 16 on the wheel 1 by means of a spring 19 the pressure of which is adapted to be overcome by the compressing action of the nut-forming member 7 on a stronger spring 20 interposed between the nut-forming member 7 and the pinion 17.

On the blower pipe 13 is rigidly secured by means of a set-screw 22 a toothed wheel 23 meshing with the pinion 17. The wheel 23 is provided with a cam 24 adapted to operate through the medium of a trigger 25 a spring-pressed valve 26 controlling the supply of cleaning fluid to the blower tube 13 through the gooseneck 4.

In operating the blower, the sheave wheel 1 is rotated to retract the nut-forming member 7 and to project the blower nozzle 14 into the furnace; continued rotation of the sheave wheel 1 compresses the stronger spring 20 between the nut-forming member 7 and the pinion 17 and consequently the spring 19 normally holding the dog teeth 16, 18 apart, so that the sheave wheel 1 and pinion 17 are clutched together. The pinion 17 is then rotated by the sheave wheel thereby rotating the blower pipe 13 so that the cam 24 operates the valve 26 controlling the supply of cleaning fluid to the blower. Rotation of the sheave wheel 1 in the opposite direction displaces forwardly the nut-forming member 7, followed by disengagement of the clutch 16, 18 to allow the valve 26 to close, and effects retraction of the blower nozzle 14 into the wall box 6.

A distance piece 21 is provided to form an abutment for the nut-forming member 7 to prevent rotation of the sheave wheel 1 through more than the desired number of revolutions.

In lieu of operating the blower by means of a sheave wheel or chain wheel the blower may of course be operated by a crank attached to the end of the screw threaded spindle 2.

To insure that the clutch elements 16, 18 will not disengage while the valve 26 is open there is adjustably attached to the toothed wheel 23 a segmental stopper plate 27 whose outer peripheral margin is adapted, during the period of opening of the valve 26, i. e. while the trigger 25 is engaged by the cam 24, to enter into obstructing relation with a rear shoulder 28 presented by the pinion 17.

As will readily be understood, while the marginal edge of the stopper plate 27 is disposed in obstructing relation with the shoulder 28 the pinion 17 cannot be displaced rearwardly under the action of the spring 19, whereby to disengage the clutch elements 16, 18, until the stopper plate 27 moves beyond the pinion 17 in the rotation of the toothed wheel 23.

I claim:—

1. In a boiler cleaner, a blower nozzle, means to move the nozzle longitudinally from a stored to a blowing position when operated in one direction and to return the nozzle to stored position when operated in a reverse direction, a valve controlling the supply of cleaning fluid to the nozzle, means to rotate the element and actuate the valve including a gear operatively connected only at times to an operating member, and means insuring that said gear is connected to said operating member while the valve is open.

2. In a boiler cleaner, a blower nozzle, means to move the nozzle longitudinally from a stored to a blowing position, a valve controlling the supply of cleaning fluid to the nozzle, means to rotate the element and actuate the valve, an operating member common to both said means, a clutch automatically connecting said second named means to the operating member whereby the nozzle may be rotated and the valve opened, and means preventing the disengagement of said clutch while the valve is open.

3. In combination, a blower nozzle mounted for longitudinal movement from a stored to a blowing position, levers connected to said blower nozzle for moving the same to either of said positions, a threaded member, a lever actuating member connected to said levers for actuating the same and threadedly engaging said threaded member, means preventing rotation of said lever actuating member whereby said member is moved longitudinally of said threaded member upon rotation of the latter, a drive member for rotating said threaded member, means for rotating said blower nozzle, and means controlled by movement of said lever actuating member for coupling said blower nozzle rotating means to said drive member.

GORDON MacCONVILLE.